United States Patent

Sobolev et al.

[11] 4,008,214
[45] Feb. 15, 1977

[54] SYNERGISTIC FLAME-RETARDING COMPOSITIONS FOR CELLULOSIC BOARDS

[75] Inventors: Igor Sobolev, Orinda; Erwin Panusch, Livermore, both of Calif.

[73] Assignee: Kaiser Aluminum & Chemical Corporation, Oakland, Calif.

[22] Filed: Dec. 8, 1975

[21] Appl. No.: 638,401

[52] U.S. Cl. .......................................... 260/17.3
[51] Int. Cl.² ........................................ C08L 1/02
[58] Field of Search ................................ 260/17.3

[56] References Cited

UNITED STATES PATENTS 3,699,041 10/1972 Sanderford et al. ............. 106/38.5
3,874,990 4/1975 Surdyk .............................. 260/15

Primary Examiner—Edward M. Woodberry
Attorney, Agent, or Firm—Paul E. Calrow; Andrew E. Barlay

[57] ABSTRACT

Flame-retardant cellulosic hardboards and particle boards are made by incorporating in the boards a synergistically acting flame-retarding composition containing at least about 30% by weight (calculated on the weight of the flame-retarded board) alumina hydrate in combination with one of the following compositions: melamine-formaldehyde-phosphate, urea-formaldehyde-phosphate or dicyandiamide-formaldehyde-phosphate.

16 Claims, 3 Drawing Figures

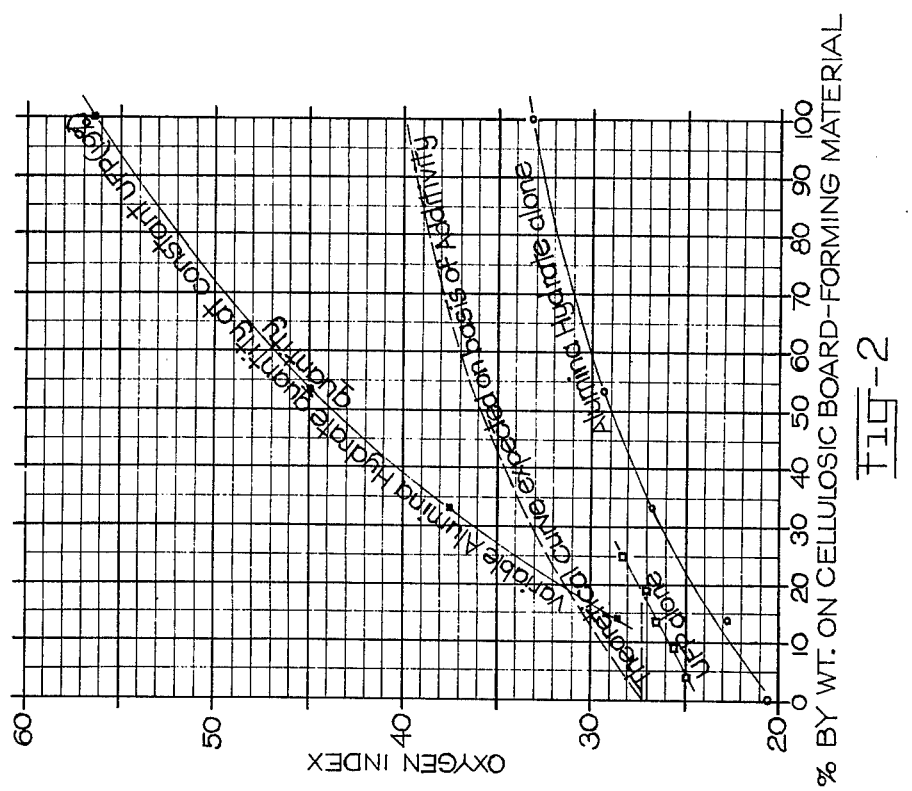
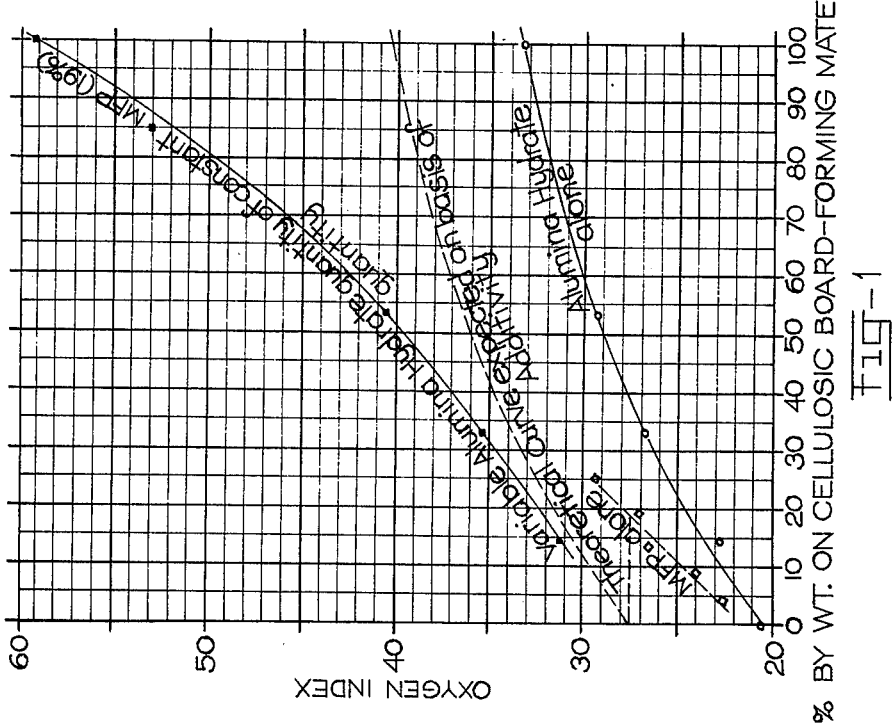

SYNERGISTIC FLAME-RETARDING COMPOSITIONS FOR CELLULOSIC BOARDS

BACKGROUND OF THE INVENTION

In recent times more and more emphasis is being placed on the flame retardancy of construction materials, such as employed both in interior and in exterior applications. Cellulosic hardboards and particle boards are widely utilized in the construction of buildings and due to their high organic content they present a potential fire hazard. This undesirable property has been long recognized and numerous attempts have been made to impart flame retardance to these boards, with varying degrees of success.

Early attempts described in U.S. Pat. Nos. 1,907,711 and 2,108,761 involve the use of inorganic fillers, such as alumina hydrate, asbestos, Fuller's earth and vermiculite as flame retarding agents; more recent patents, such as U.S. Pat. No. 3,873,662 and Canadian Pat. No. 971,049 recommend the use of sodium borate and mono and dibasic ammonium phosphates for the same purpose. It has also been suggested that condensation products of the reaction of formaldehyde with a nitrogen-containing compound such as urea, melamine, dicyandiamide or quanidine will impart flame retardancy to cellulosic boards when incorporated in such boards with small quantities of an inorganic filler, for example up to 25% by weight alumina hydrate, calculated on the weight of the finished board.

Thus, U.S. Pat. Nos. 2,611,694 and 2,680,102 recommend the use of flame-retarding compositions consisting of a urea or melamine-formaldehyde resin in combination with a chlorinated paraffin and small quantities of alumina hydrate. U.S. Pat. Nos. 2,488,034, 2,628,946, 2,632,743, 2,872,355, 2,917,408, 3,159,503, 3,372,131, 3,479,211, 3,786,041, 3,832,316, 3,887,511 and Canadian Pat. No. 972,227 employ as flame-retarding agents the above-mentioned melamine-formaldehyde or urea-formaldehyde condensation products in combination with phosphoric acid or the phosphate salt of the nitrogen-containing constituent of the condensate. Further attempts in rendering cellulosic products, such as hardboards and particle boards, flame retardant are described in Japanese Published Specification No. 92,139 of 1974, which was published on Sept. 2, 1974. In this reference a cellulosic board is coated on its surface with a composition containing a urea or melamine-formaldehyde precondensate, ammonium phosphate or an organic phosphate salt, a polyhydric alcohol and a metal hydroxide filler, such as alumina hydrate, zinc hydroxide or ferric hydroxide. The coating is applied on the board surface and then is covered with a waterproofing material to preserve the effectiveness of the flame-retarding layer. Although the art in flame-retarding cellulosic boards is extensive, the available references fail to suggest the incorporation of the present flame retarding composition in cellulosic boards which consists of the synergistic combination of alumina hydrate with melamine-formaldehyde-phosphate or with urea-formaldehyde-phosphate; or with dicyandiamide-formaldehyde-phosphate. The extent of the published prior art in the field of rendering cellulosic boards flame retardant not only indicates the importance of the problem i.e., the need for improved flame retardancy, but it also shows that the compositions described do not meet in all respects the stringent flame retardance standards presently required from products to be employed in the construction of residential and/or industrial structures.

In order to meet these currently desired strict requirements of flame retardancy, defined for example by oxygen indices in excess of about 40, a novel flame-retarding composition is provided for cellulosic boards wherein a synergistic effect is obtained by using a combination of an organic polyfunctional amine or amide phosphate salt with alumina hydrate. The synergistic effect between the phosphorous-containing compound and alumina hydrate is achieved only when the alumina hydrate is present in an amount corresponding to not less than about 30%, based on the total weight of the flame-retardant board. Lesser quantities of alumina hydrate at best provide only an additive flame-retarding effect with the phosphorus containing compound; unexpectedly increased flame-retarding efficiency can only be observed when the above-described minimum quantity of hydrate or more is utilized.

SUMMARY OF THE INVENTION

Cellulosic boards, such as hardboards and particle boards, are rendered flame retardant by incorporating in the boards synergistically acting flame-retarding compositions selected from the group consisting essentially of alumina hydrate-melamine-formaldehyde-phosphate, alumina hydrate-urea-formaldehyde-phosphate and alumina hydrate-dicyanidamide-formaldehyde-phosphate. The quantity of alumina hydrate in the cellulosic board is kept at least about 30% by weight of the flame retarded board at an organic phosphate content in the range from about 8% to about 22% by weight of the board forming cellulosic material. The synergistically acting flame-retarding compositions provide oxygen indices in excess of about 40. Particularly good flame-retarding results are obtained when the alumina hydrate quantity is in the range of about 30–60% by weight of the flame-retarded board at the indicated 8–22% by weight organic phosphate content.

BRIEF DESCRIPTION OF THE FIGURES

FIG. 1 shows the correlation between oxygen index values and alumina hydrate-melamine-formaldehyde-phosphate quantities incorporated in cellulosic boards at varying hydrate concentrations;

FIG. 2 presents the correlation between oxygen index values and alumina hydrate-urea-formaldehyde-phosphate quantities incorporated in cellulosic boards at varying hydrate concentrations;

DETAILED DESCRIPTION OF THE INVENTION

Figure 3:
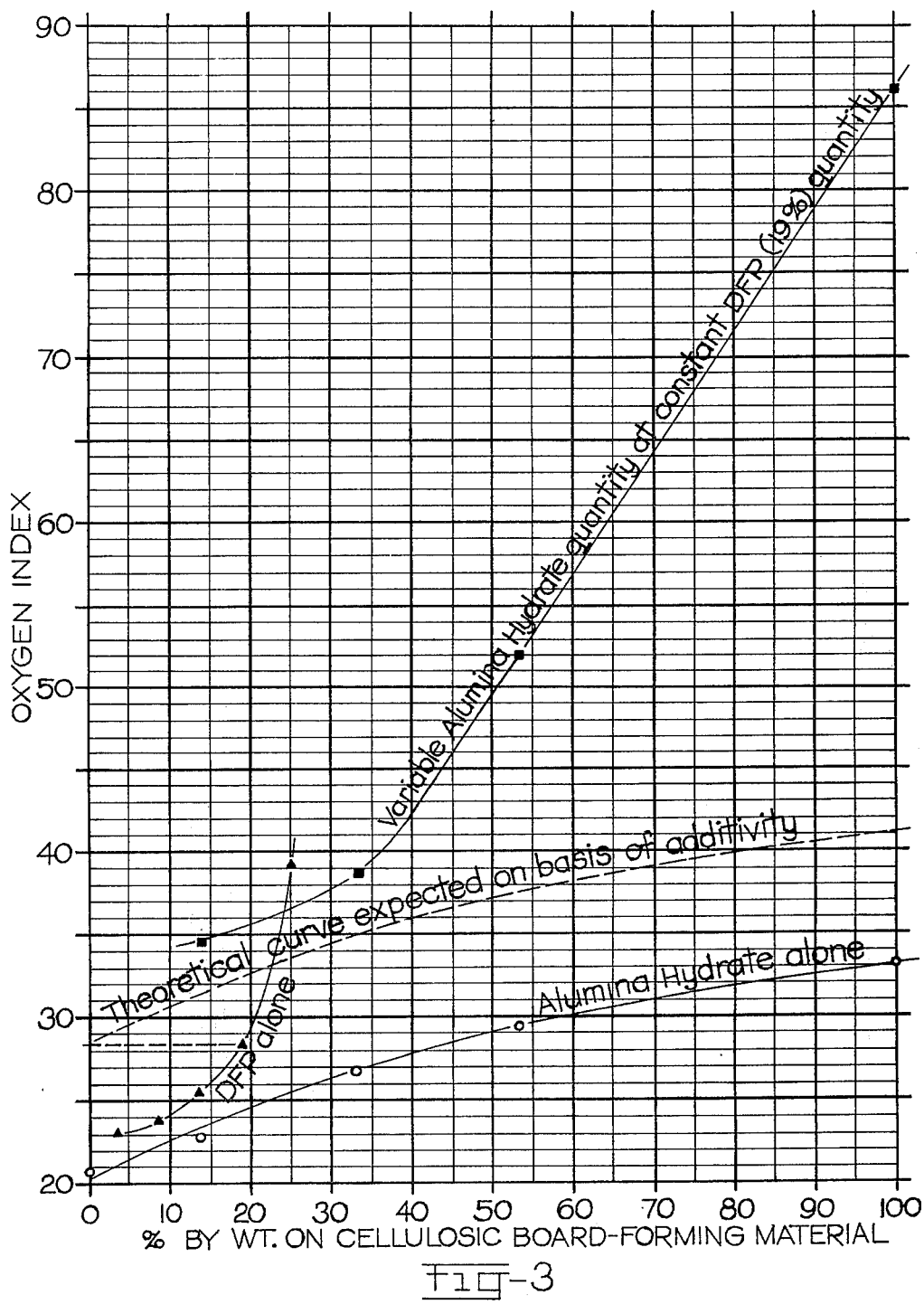
FIG. 3 depicts the correlation between oxygen index values and alumina hydrate-dicyandiamide-formaldehyde-phosphate amounts in cellulosic boards at varying hydrate concentrations.

The instant invention concerns synergistic flame-retarding compositions imparting an unexpectedly high degree of flame retardancy to cellulosic boards, such as hard-boards and particle boards. The flame retarding compositions of the present invention include the following:

1. Alumina hydrate-melamine-formaldehyde-phosphate combinations hereinafter referred to as "AMFP";
2. Alumina hydrate-urea-formaldehyde-phosphate combinations hereinafter referred to as "AUFP";

3. Alumina hydrate-dicyandiamide-formaldehyde-phosphate combinations hereinafter referred to as "ADFP".

The alumina hydrate ingredient of the novel, synergistic flame-retarding compositions of the instant invention refers to an aluminous compound containing at least about 50% by weight of a hydrated alumina of the general formula $Al_2O_3 \cdot x\ H_2O$, wherein $x$ is a value in the range of 1.0–3, the compound shown as $Al_2O_3 \cdot 3\ H_2O$, being the fully hydrated gibbsite or $Al(OH)_3$. While it is being preferred to employ an aluminous compound containing at least about 90% by weight of $Al_2O_3 \cdot 3H_2O$, use of mixtures of hydrate aluminas falling within the range of $Al_2O_3 \cdot H_2O$ and $Al_2O_3 \cdot 3H_2O$ is equally contemplated by the present invention.

The melamine-formaldehyde-phosphate compound of the instant invention hereinafter referred to as "MFP" is employed in the form of solid composition. It is prepared by reacting melamine and formaldehyde in a mole ratio of about 0.70 – 3.0 to 1 in an aqueous medium followed by addition of aqueous phosphoric acid in an amount to obtain a melamine: $H_3PO_4$ mole ratio of about 1.0–3.0:1. The solid reaction product, i.e. MFP, is suitable for use in combination with alumina hydrate as a synergistic flame-retarding composition for cellulosic boards. The MFP reaction product is substantially insoluble in water and can be added to the cellulosic board furnish either as a slurry or as a dry powder.

The urea-formaldehyde-phosphate compound of the instant invention, hereinafter referred to as "UFP" is generally employed as a solution of dispersion in combination with alumina hydrate. It is prepared by reacting urea with formaldehyde in a mole ratio about 2.0–5.0 moles of urea to 1 mole of formaldehyde. The resulting reaction mixture is then reacted with aqueous phosphoric acid in the ratio of about 1.0–3.0 moles of urea to 1.0 mole of $H_3PO_4$. The produced UFP is suitable for use in combination with alumina hydrate as a synergistic flame-retarding composition.

The dicyandiamide-formaldehyde-phosphate compound, hereinafter referred to as "DFP" is employed as a solution in combination with alumina hydrate. It is prepared by reacting dicyandiamide with formaldehyde in a dicyandiamide:formaldehyde mole ratio of about 1.0–3.0:1. The formed reaction mixture is then reacted with aqueous $H_3PO_4$ in a dicyandiamide-$H_3PO_4$ mole ratio of about 1.0–3.0:1. The produced solution can then be used together with alumina hydrate as a synergistic flame retardant for cellulosic boards.

For the purposes of the instant invention the term "cellulosic boards" refers to hard-boards and particle boards containing at least about 35% by weight cellulosic constituents exclusive of flame retarding additives. The cellulosic constituents employed include, but are not limited to cellulose, wood chips from any source containing at least about 35% by weight cellulose, sawdust, straw or sugar cane bagasse.

Manufacture of such boards can proceed in any well known manner and since the manufacture of the boards does not form part of the invention a description of the general state of the art will not be presented apart from the preparation of the board samples incorporating the novel synergistic flame retarding compounds.

The flame-retarding effect of the synergistic compositions of the present invention is determined by measuring the "oxygen index" of the boards having these compositions incorporated therein. Measurement of the oxygen index is accomplished by using the method described in ASTM D2863. The oxygen index of a material is the minimum mole fraction of oxygen in a slowly rising mixture of oxygen and nitrogen which will just support combustion of the specimen being tested. The higher the oxygen index of the board the better the flame-retarding effect imparted to the cellulosic boards by the flame-retarding agents.

It has been found by measurement of oxygen index values that AMFP, AUFP or ADFP flame retarding compositions containing less than 30% by weight alumina hydrate (calculated on the weight of the flame retarded board and being equivalent to about 45% by weight on the board forming cellulosic material) provide at best an additive flame retardancy effect resulting from the incorporation of alumina hydrate and the phosphate containing organic flame retardant. However, when the alumina hydrate content in the board is increased to an amount exceeding about 30% by weight of the flame retarded board, (about 53% by weight of the board forming cellulosic material), a sudden and unexpected rise in the observed oxygen index value (in excess of about 40) indicates the onset of a synergistic flame-retarding effect provided by the combination of the hydrate and the phosphate containing organic composition. This synergism becomes more and more pronounced as the hydrate quantity in the board is increased and is depicted in FIGS. 1–3.

In order to obtain this synergistic flame-retarding effect it has been found that the minimum quantity of alumina hydrate to be utilized in the AMFP, AUFP or ADFP compositions should not be less than 30% by weight, preferably in excess of about 35% by weight of the flame-retarded board. Naturally, this minimum quantity of alumina hydrate can be increased if one desires a higher oxygen index value.

The quantity of MFP, UFP or DFP employed in the synergistic flame-retarding compositions of the present invention is generally selected to be in the range of about 8 to about 22% by weight of the board forming cellulosic material. When the weight of the organic phosphate containing compound is selected to be within this range and the alumina hydrate quantity is not less than 30% by weight of the flame-retarded board, synergistic flame retarding properties can be observed.

The maximum amount of the alumina hydrate to be incorporated in the board in combination with MFP, UFP or DFP is determined by (a) the desired oxygen index value; (b) the mechanical properties of the flame retarded board and (c) the economy of the process. Thus, under practical circumstances where maximum flame retardance is desired with minimum loss of structural strength it has been found that the hydrate quantity should be in the range of about 30–60% by weight of the flame-retarded board (about 45 to 200% by weight of the board forming cellulosic material) at the above-mentioned 8–22% by weight organic phosphate loading. While higher amounts of hydrate can also be employed, the strength properties of the finished cellulosic board may be adversely affected.

Incorporation of the synergistic flame-retarding compositions in the cellulosic boards can be accomplished in several ways. One method of incorporation involves the preparation of a slurry from the alumina hydrate and organic phosphate component and the application of this slurry to the pump from which the boards are subsequently made. Solutions of UFP and DFP can be used to impregnate wet sheets of cellulosic fibers or chips; the fibers or chips can be also soaked in the UFP or DFP solutions prior to formation of sheets. When the impregnation method is employed, the alumina hydrate constituent of AUFP or ADFP flame-retarding compositions is added prior to sheet formation, generally to the slurry of cellulosic board forming materials, for example to a slurry of fibers or chips. This type of incorporation allows uniform distribution of the alumina hydrate particles on the surface and between the board forming materials. In the case of AMFP, where both the alumina hydrate and the organic phosphate constituents may be in solid form, the best results can be achieved when these solids are admixed in the desired ratio prior to incorporation in the board. The mixture is then added to the slurry of the board forming materials. If the MFP constituent of the AMFP flame-retarding composition is employed in an aqueous dispersion, which may also contain a small quantity of dissolved MFP, this dispersion can be added separately or in admixture with the hydrate constituent to the slurry of board forming materials.

Further processing of these slurries, containing the desired quantities of flame-retarding agents, can proceed in any well-known manner to the finished product, i.e., the hardboards or particle boards.

To further illustrate the unexpected flame-retarding properties imparted to cellulosic boards by using the novel, synergistic AMFP, AUFP and/or ADFP compositions, the following examples are provided:

EXAMPLE I

Flame-retardant hardboards were prepared using AMFP as the synergistically acting flame-retarding agent.

Preparation of MFP

To 500 ml water, 72.5 g melamine and 20.3 g 37% aqueous formaldehyde were added and the pH of the mixture was adjusted to about 8 with a few drops of dilute NaOH. The mixture was refluxed under stirring for 1 hour; then the heat source was removed and 43.2 g $H_3PO_4$ (85%) was slowly added under agitation. The resulting slurry was refluxed for 45 minutes under agitation. Subsequently, the slurry was cooled, the solids were separated and after drying of the solids in a vacuum oven at 80° C overnight, 105.5 g MFP product was recovered. Analysis of the MFP product indicated a 9.5% phosphorous content corresponding to 96% of the calculated value.

MFP product, prepared according to the above process, was used to provide AMFP flame retarding compositions having a constant MFP content of about 19% (based on the weight of the cellulosic board forming material, i.e. fibers) and varying hydrate quantities within the range of 0 and 100% by weight of the fibers.

Preparation of the AMFP Flame-Retarded Hardboards

To 330 g wet unbleached wood pulp of 123 g solids content, 6.5 l water was added and the slurry was agitated until a substantially uniform distribution of the pulp in the slurry was obtained. To this slurry 17.2 g phenol-formaldehyde binder was then added with agitation, followed by about 23.4 g MFP (about 19% by weight of the dry pulp) and about 17.6 g alumina hydrate ($Al_2O_3 \cdot 3H_2O$), corresponding to about 14% by weight of the dry pulp. The slurry was then poured on a filter and allowed to drain. Subsequently vacuum was applied to the filter while pressure was applied on the surface of the pulp to achieve uniform drainage and consequently a uniform cake thickness. The cake was then placed on a screen and partially dried for 1.5 hours at 100° C. The partially dried cake was then pressed to a board in a conventional press at a platen temperature of about 200° C at an initial pressure of about 30.5 kg/cm² for 8–9 minutes followed by final pressing at about 10 kg/cm². A platen of 31.75 × 31.75 cm (12.5 × 12.5 in) size was used and a board of about 264 cm² surface area was obtained.

The board-making process was repeated using about 23.4 g MFP in each board and varying amounts of alumina hydrate (0, 33, 53 and 100% by weight respectively calculated on the weight of the dry pulp). Boards were also prepared using varying MFP quantities (4.1, 8.7, 13.6, 19 and 25% by weight respectively based on the weight of the dry pulp) without the hydrate component of the flame-retarding composition. A control board, free of AMFP, was also prepared. All boards were then subjected to flame-retardancy testing by measuring the oxygen index values according to the ASTM D2863 method. The results are shown in Table 1.

TABLE I

| Board Sample | MFP % by Wt. on Dry Pulp | Alumina Hydrate % by Wt. On Dry Pulp | Oxygen Index |
|---|---|---|---|
| Control | — | — | 20–21 |
| 1 | 4.1 | — | 22.6 |
| 2 | 8.7 | — | 24 |
| 3 | 13.6 | — | 26.5 |
| 4 | 19 | — | 27.1 |
| 5 | 25 | — | 29.3 |
| 6 | 19 | 14 | 31.2 |
| 7 | 19 | 35 | 35.2 |
| 8 | 19 | 53 | 41.6 |
| 9 | 19 | 100 | 59.2 |
| 10 | — | 53 | 29.4 |
| 11 | — | 100 | 33.2 |

These results are also shown in FIG. 1, where the oxygen index values are plotted in relationship to the loading of various constituents of the AMFP flame-retarding composition. The dotted line indicates the theoretical curve expected if the flame-retarding properties of AMFP compositions were only additive. It can be clearly observed that at about 53% alumina hydrate content (based on the weight of dry pulp) true synergistic flame retarding properties are obtained between the alumina hydrate and MFP constituents of the novel AMFP composition.

EXAMPLE II

Flame retardant hardboards were prepared using AUFP as the synergistically acting flame-retardant agent.

Preparation of UFP

To 300 ml water, 24.3 g HCHO (37%) was added and the solution, after adjustment of its pH to about 8, was heated to 90° C. To the hot solution 63 g urea was added in portions and the reaction mixture was kept at 90°–95° C for 30 minutes. After cooling to room temperature the mixture was diluted with water to obtain a total weight of 405 g. This solution was then mixed with sufficient 85% $H_3PO_4$ to obtain a urea:formaldehyde:phosphorous molar ratio of 3.5:1.0:1.5. The slightly milky solution of UFP was then used as the phosphate constituent of the synergistic AUFP flame-retardant composition.

Preparation of AUFP Flame-Retarded Hard-Boards

To 330 g wet wood pump of 123 g solids content, 6.5 l water was added and the slurry was agitated until a substantially uniform distribution of the pulp in the slurry was obtained. To this slurry 17.2 g phenol-formaldehyde binder and about 53% by weight alumina hydrate ($Al_2O_3 \cdot 3H_2O$), calculated on the dry weight of pulp, were added under agitation. The slurry was then poured on a filter and dewatered using at first gravity flow, then vacuum. To the dewatered cake 19% by weight UFP (calculated on the weight of the dry pulp) was added and allowed to impregnate the cake. Subsequently, a board of about 264 $cm^2$ surface area was formed using the process described in Example I. Additional AUFP treated boards were also prepared using varying amounts of alumina hydrate (0, 14, 33 and 100% respectively, calculated on the dry weight of the pulp). Boards free of alumina hydrate and containing varying quantities of UFP were also made having UFP contents of 4.1, 8.7, 13.6, 19 and 25% respectively, calculated on the dry weight of the pulp. The boards were then tested for flame retardancy by measuring their oxygen index. The results are shown in Table II.

TABLE II

| Board Sample | UFP % by Wt. on Dry Pulp | Alumina Hydrate % by Wt. On Dry Pulp | Oxygen Index |
| --- | --- | --- | --- |
| Control | — | — | 20–21 |
| 1 | 4.1 | — | 25.0 |
| 2 | 8.7 | — | 25.6 |
| 3 | 13.6 | — | 26.5 |
| 4 | 19 | — | 27.1 |
| 5 | 25 | — | 28.3 |
| 6 | 19 | 14 | 28.6 |
| 7 | 19 | 33 | 37.7 |
| 8 | 19 | 53 | 44.9 |
| 9 | 19 | 100 | 56.4 |
| 10 | — | 53 | 29.3 |
| 11 | — | 100 | 33.2 |

The data shown in Table II and also graphically in FIG. 2 demonstrates the synergistic flame retarding effect obtained by employing AUFP as a flame-retarding agent. In FIG. 2, the dotted line curve indicates the theoretical oxygen index values predicted if the flame retardancy obtained from the combination of alumina hydrate and UFP had been merely additive.

EXAMPLE III

Flame retardant hardboards are made using ADFP as the synergistically acting flame-retarding agent.

Preparation of DFP

A solution of DFP having a dicyandiamide:formaldehyde: phosphorus molar ratio of 2.3:1.0:1.5 was made by adding to 300 ml water 24.3 g 37% HCHO. After adjustment of the pH to 8, The solution was heated to 82° C and 58 g dicyandiamide were added in increments under agitation. The resulting solution as kept at 80°–85° C for 30 minutes, followed by the gradual addition of 51.9 g 85% $H_3PO_4$ under agitation. The reaction mixture was then kept at 85°–87° C for 15 minutes, followed by cooling to room temperature and dilution with water to a final weight of 403 g. This solution, forming the DFP constituent of the ADFP flame-retarding agent, was then used to impregnate dewatered pulp cakes.

Preparation of the ADFP Flame-Retarded Hard Boards 330 g wet wood pulp of 123 g solids content was slurried in 6.5 l water under agitation, followed by the addition of 17.2 g phenol-formaldehyde binder and about 53% by weight alumina hydrate ($Al_2O_3 \cdot 3H_2O$) calculated on the dry weight of the pulp. The well-stirred slurry was then filtered on a vacuum filter, at first by gravity filtration and then by application of vacuum. To the dewatered cake 19% by weight DFP, calculated on the dry weight of pulp, was added and then a hard board was formed in accordance with the process described in the previous examples. Additional boards were also prepared using 0, 14, 33 and 100% by weight alumina hydrate loadings at 19% by weight DFP loadings. Boards free of alumina hydrate and containing 4.1, 8.7, 13.6, 19 and 25% DFP respectively were also prepared. The oxygen index values of all of these boards were measured and reported in Table III.

The results shown in Table III again prove the synergistic flame-retarding action achieved by using alumina hydrate quantities in excess of about 30% by weight (calculated on the weight of the cellulosic flame retarded board) in combination with a phosphorus containing composition such as DFP.

The results obtained by using ADFP as the flame-retarding agent are also plotted in FIG. 3. In this Figure, the curve depicted by dotted lines indicates the theoretically expected flame retardance if the effects of alumina hydrate and DFP were only additive.

TABLE III

| Board Sample | DFP % by Wt. on Dry Wood Pulp | Alumina Hydrate % by Wt. on Dry Wood Pulp | Oxygen Index |
| --- | --- | --- | --- |
| Control | — | — | 20–21 |
| 1 | 4.1 | — | 23.2 |
| 2 | 8.7 | — | 23.8 |
| 3 | 13.6 | — | 25.6 |
| 4 | 19 | — | 28.3 |
| 5 | 25 | — | 39.3 |
| 6 | 19 | 14 | 34.5 |
| 7 | 19 | 33 | 38.6 |
| 8 | 19 | 53 | 52.0 |
| 9 | 19 | 100 | 86.3 |
| 10 | — | 53 | 29.6 |
| 11 | — | 100 | 33.2 |

EXAMPLE IV

Flame retardant hard boards are made using a dry mixture of MFP and alumina hydrate as the synergistically acting flame-retarding composition.

The MFP constituent of the flame-retarding agent was made according to the method described in Example I. The solid MFP product obtained was then used to make dry mixtures with alumina hydrate by admixing these compounds in desired ratios.

Thus, dry mixtures were made each containing about 24 g MFP (about 19% by weight of the board forming fibers) and the following quantities of alumina hydrate: 0 and 53% weight of the board forming fibers. From these mixtures boards were made by adding the mixtures under agitation to dry fibers containing the required quantity of phenol-formaldehyde resin, followed by formation of mats from the dry mixtures. Mat formation proceeded in a forming box at an initial pressure of 3500 kg at room temperature, followed by heating to about 204° C under 9000 kg pressure for 8.5 minutes. Subsequently, the pressure was allowed to drop to 3500 kg for a few minutes, then the boards were allowed to cool.

Control samples containing no flame retardant; 53 and 100% by weight alumina hydrate, free of MFP, were also prepared. The oxygen indices of all boards were then determined using the ASTM D2863 method. The results are reported in Table IV.

TABLE IV

| Board Sample | MFP % by Wt. on Dry Wood Pulp | Alumina Hydrate % by Wt. on Dry Wood Pulp | Oxygen Index |
|---|---|---|---|
| Control | — | — | 24.4 |
| 1 | 19 | 0 | 29.5 |
| 2 | 19 | 53 | 47.5 |
| 3 | — | 53 | 32.3 |

Although these examples only show preparation of cellulosic boards from wood pulp, the instant, synergistic flame-retarding compositions are equally effective for the production of flame-retarded particle boards. The incorporation of the AMFP, AUFP and ADFP flame-retardants in particle boards proceeds in the same manner as described for hardboards and the oxygen index values of particle boards flame-retarded with AMFP, AUFP or ADFP are equally significantly increased by the application of the synergistic flame-retarding compositions of the instant invention.

Experiments have also been conducted to determine the effect of formaldehyde in the instant synergistic flame-retarding compositions. It has been found that the presence or absence of formaldehyde does not materially affect the oxygen index values of cellulosic boards which have been flame-retarded by the incorporation of the instant synergistic compositions. However, it has been ascertained that the strength properties of cellulosic board which have been flame-retarded with formaldehyde-free compositions, were significantly influenced, generally, the absence of formaldehyde reduced the strength of these boards.

Consequently, while the instant synergistically acting flame-retarding compositions can be employed with or without the formaldehyde component, for best results in terms of strength properties, incorporation of formaldehyde in the compositions is recommended.

What is claimed is:

1. A synergistically acting flame-retarding composition for cellulosic boards which comprises alumina hydrate in combination with an organic, phosphate-containing compound selected from the group consisting essentially of melamine-formaldehyde-phosphate, urea-formaldehyde-phosphate and dicyandiamide-formaldehyde phosphate, wherein the alumina hydrate quantity is not less than 30% by weight of the flame-retarded board and the organic, phosphate-containing compound in the board is in the range of about 8 to about 22% by weight of the board forming cellulosic material.

2. Composition of claim 1, wherein the quantity of alumina hydrate in the flame-retarded board is in the range of about 30–60% by weight.

3. Composition of claim 1, wherein the flame-retarded board is a hardboard.

4. Composition of claim 1, wherein the flame-retarded board is a particle board.

5. Composition of claim 1, wherein the organic, phosphate compound is melamine-formaldehyde-phosphate and the melamine to formaldehyde mole ratio is about 0.70–3.0:1 and the melamine to phosphate mole ratio, expressed as $H_3PO_4$, is about 1.0–3.0:1.

6. Composition of claim 1, wherein the organic, phosphate compound is urea-formaldehyde-phosphate and the urea to formaldehyde mole ratio is about 2.0–5.0:1 and the urea to phosphate mole ratio, expressed as $H_3PO_4$, is about 1.0–3.0:1.

7. Composition of claim 1, wherein the organic, phosphate compound is dicyandiamide-formaldehyde-phosphate and the dicyanidiamide to formaldehyde mole ratio is about 1.0–3.0:1 and the dicyandiamide to phosphate mole ratio, expressed as $H_3PO_4$, is about 1.0–3.0:1.

8. Process for rendering a cellulosic board flame retardant which comprises incorporating in the board a synergistically acting flame-retarding composition constituted of alumina hydrate in combination with an organic, phosphate-containing compound selected from the group consisting essentially of melamine-formaldehyde-phosphate, urea-formaldehyde-phosphate and dicyandiamide-formaldehyde-phosphate, wherein the quantity of alumina hydrate is not less than 30% by weight of the flame-retarded board and the organic, phosphate-containing compound in the board is in the range of about 8% to about 22% by weight of the board forming cellulosic material, and recovering a flame-retarded board having an oxygen index in excess of about 40.

9. Process of claim 8, wherein the quantity of alumina hydrate is in the range of about 30–60% by weight of the flame-retarded board.

10. Process of claim 8, wherein the organic, phosphate-containing compound is melamine-formaldehyde-phosphate and the melamine to formaldehyde mole ratio is about 0.7–3.0:1 and the melamine to phosphate mole ratio expressed, as $H_3PO_4$, is about 1.0–3.0:1.

11. Process of claim 8, wherein the organic, phosphate-containing compound is urea-formaldehyde-phosphate and the urea to formaldehyde mole ratio is about 2.0–5.0:1 and the urea to phosphate mole ratio, expressed as $H_3PO_4$, is about 1.0–3.0:1.

12. Process of claim 8, wherein the organic, phosphate-containing compound is dicyandiamide-formaldehyde-phosphate and the dicyandiamide to formaldehyde mole ratio is about 1.0–3.0:1 and the dicyandiamide to phosphate mole ratio, expressed as $H_3PO_4$, is about 1.0–3.0:1.

13. Process of claim 8, wherein the cellulosic board is a hardboard.

14. Process of claim 8, wherein the cellulosic board is a particle board.

15. Process of claim 8, wherein the melamine-formaldehyde-phosphate compound is incorporated in the board as a solid.

16. Process of claim 8, wherein the melamine-formaldehyde-phosphate compound is incorporated in the board in slurry form.

* * * * *